(12) United States Patent
Bhogal et al.

(10) Patent No.: US 7,248,563 B2
(45) Date of Patent: Jul. 24, 2007

(54) METHOD, SYSTEM, AND COMPUTER PROGRAM PRODUCT FOR RESTRICTING ACCESS TO A NETWORK USING A NETWORK COMMUNICATIONS DEVICE

(75) Inventors: Kulvir Singh Bhogal, Fort Worth, TX (US); Nizamudeen Ishmael, Jr., Austin, TX (US); Mandeep Singh Sidhu, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 1155 days.

(21) Appl. No.: 10/210,526

(22) Filed: Jul. 31, 2002

(65) Prior Publication Data

US 2004/0022242 A1     Feb. 5, 2004

(51) Int. Cl.
    *H04J 3/14*    (2006.01)
(52) U.S. Cl. .................. 370/230; 709/225; 726/4; 726/13
(58) Field of Classification Search ........... 370/230, 370/230.1, 235; 709/225; 726/4, 11
    See application file for complete search history.

(56) References Cited

U.S. PATENT DOCUMENTS

| | | | |
|---|---|---|---|
| 5,678,041 A | 10/1997 | Baker et al. ............ 395/609 |
| 5,696,898 A | 12/1997 | Baker et al. ............ 395/167.01 |
| 5,706,507 A | 1/1998 | Schloss ................. 395/615 |
| 6,061,798 A * | 5/2000 | Coley et al. ............. 726/12 |
| 6,088,722 A | 7/2000 | Herz et al. .............. 709/217 |
| 6,163,316 A | 12/2000 | Killian .................. 345/327 |
| 6,177,931 B1 | 1/2001 | Alexander et al. ........ 345/327 |
| 6,286,001 B1 | 9/2001 | Walker et al. ........... 707/9 |
| 6,324,552 B1 | 11/2001 | Chang et al. ............ 707/501 |
| 6,754,831 B2 * | 6/2004 | Brownell ................ 726/15 |
| 6,990,592 B2 * | 1/2006 | Richmond et al. ......... 726/15 |
| 7,024,478 B1 * | 4/2006 | Dalgic et al. ............ 709/225 |
| 7,028,051 B1 * | 4/2006 | McMullan et al. ......... 707/104.1 |
| 7,131,140 B1 * | 10/2006 | O'Rourke et al. ......... 726/11 |
| 2001/0012296 A1 | 8/2001 | Burgess et al. .......... 370/392 |
| 2001/0034754 A1 | 10/2001 | Elwahab et al. .......... 709/201 |
| 2001/0037385 A1 | 11/2001 | Kim .................... 709/224 |
| 2001/0051998 A1 | 12/2001 | Henderson .............. 709/217 |
| 2002/0078377 A1 * | 6/2002 | Chang et al. ............ 713/201 |

* cited by examiner

*Primary Examiner*—Hassan Kizou
*Assistant Examiner*—Jay P. Patel
(74) *Attorney, Agent, or Firm*—Duke W. Yee; Marilyn Smith Dawkins; Mari Stewart (57) ABSTRACT

A system, method, and computer program product are disclosed for restricting access to a network using a network communications device. The network communications device includes multiple ports for providing access to a data processing system to the network. A specification of one of the multiple ports is received. A specification of a time period is also received. Access to the network is then blocked through the specified port during the specified time period.

30 Claims, 5 Drawing Sheets

METHOD, SYSTEM, AND COMPUTER PROGRAM PRODUCT FOR RESTRICTING ACCESS TO A NETWORK USING A NETWORK COMMUNICATIONS DEVICE

BACKGROUND OF THE INVENTION

1. Technical Field

The present invention relates generally to the field of computer systems and, more specifically to a data processing system, method, and computer program product for restricting access to a network using a network communications device.

2. Description of Related Art

Computer systems may gain access to a network through a communications device such as a router, hub, or switch. A computer system transmits data in network packets that are received by the communications device, processed, and then forwarded on to the network. These devices typically have multiple ports that may be coupled to computer systems, communications links, or other network devices.

Known communications devices receive, process, and forward packets without regard to the identity of the sender of the packet, or the particular port through which the packet was received. As long as a packet conforms to the protocol used by the communications device, the packet will be processed.

Users may desire, however, that some limitations be placed on network access. For example, parents might want to restrict access to the network during particular times of the day when they are not available to monitor a child's use of the network. Within a business environment, security of a computer system could be strengthened by controlling network access.

Therefore, a need exists for a method, system, and computer program product for restricting access to a network using a network communications device.

SUMMARY OF THE INVENTION

A system, method, and computer program product are disclosed for restricting access to a network using a network communications device. The network communications device includes multiple ports for providing access to the network. A specification of one of the multiple ports is received within the device. A specification of a time period is also received. Access to the network is then blocked through the specified port during the specified time period.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and computer program product for restricting access to a network using a multi-port network communications device. The device may be configured to block one or more of its ports during specified time periods. During the specified time period when a port is blocked, packets received using the port will be discarded. In this manner the network communications device may be used to effectively disable a computer system's network access during a specified time period.

The network communications device may be accessed through a password protected interface, such as an Internet web page. An administrative graphical user interface (GUI) may be displayed by the web page in order to permit a user to specify one or more ports by specifying port numbers and to specify particular periods of time for the specified ports. Thus, each specified port will have an associated period of time during which it is blocked. These specifications are then stored in a database that is included within the network communications device. Each time a packet is received by the device, the device will compare the port number through which the packet was received to port numbers stored in the database. If there is a match and the port number through which the packet was received is found in the database, the device will then determine whether the current time falls within the specified time period associated with this port number. If the current time falls within the associated time period, the packet will be discarded effectively blocking the port. If the current time does not fall within the associated time period, the packet will be forwarded.

In addition, the network communications device will also store the media access control (MAC) address of a computer system when that computer system attempted to access the network through a blocked port. Each time a packet is received through a port that is not blocked, the device will determine the MAC address of the transmitting computer system and will look for that MAC address in the device's database of MAC addresses to be blocked. If the MAC address is not found, the device will forward the computer system's packet. If the blocked MAC address is found, the device will determine whether the port through which the blocked computer system originally attempted to gain network access is still blocked. If that original port is still blocked, the device will block the new port to which the computer system is newly connected. Thus, this new port is blocked temporarily and only for the particular computer system.

The present invention also permits a user to block specified computer systems from accessing the network. Through the administration GUI, a user may specify a particular computer system and a particular time period. This computer system's MAC address will then be stored in the network communications device. When a packet is received, the network communications device will compare the transmitting computer system's MAC address to the MAC addresses stored in the network communications device. If the MAC address is found and the current time falls within the specified time period, the network communications device will discard the packet. Thus, the specified computer system will be restricted from accessing the network through any port of the network communications device during the specified time period. If the MAC address is not found, the network communications device will forward the packet.

The network communications device will preferably include a first hard file database and a second database that is included in the memory in the network communications device. Port numbers and their associated time periods, and MAC addresses and their associated time periods will be stored in the first database. The first database will be continuously checked in order to identify which MAC addresses are currently stored in the first database and to determine whether the current time period falls within the time period associated with each database. Thus, a routine is executed which continuously identifies which MAC addresses should currently have restricted access. The routine then copies the MAC addresses that should currently have restricted access into the second database. The network communications device will then check the second database each time a packet is received to determine whether the computer that transmitted the packet is currently restricted from accessing the network. As long as a particular MAC address is found in the second database, it will be restricted from accessing the network through any port of the network communications device.

Figure 1:
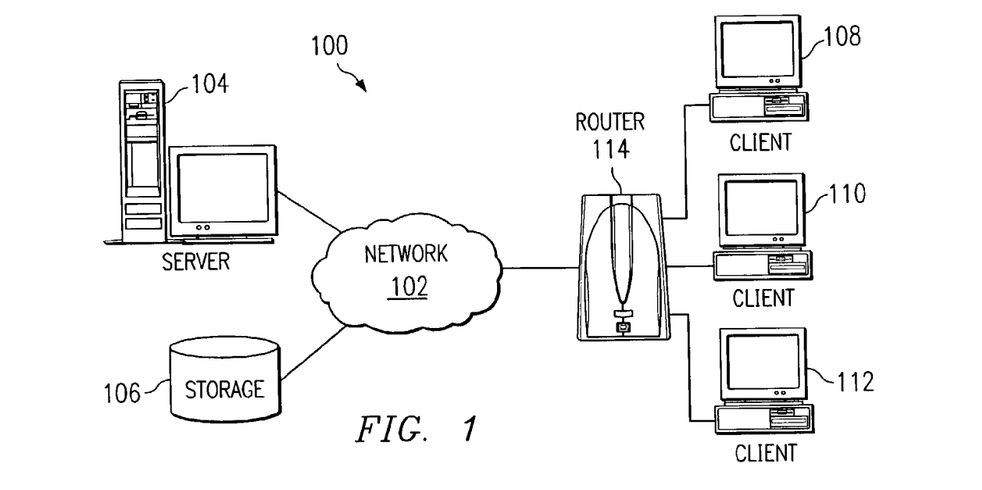
FIG. 1 is a pictorial representation which depicts a data processing system in which the present invention may be implemented.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102 through a network communications device, such as router 114. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 104 without departing from the scope of the present invention. Moreover, as used herein, communications include those enabled by wired or wireless technology.

Clients 108, 110, and 112 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
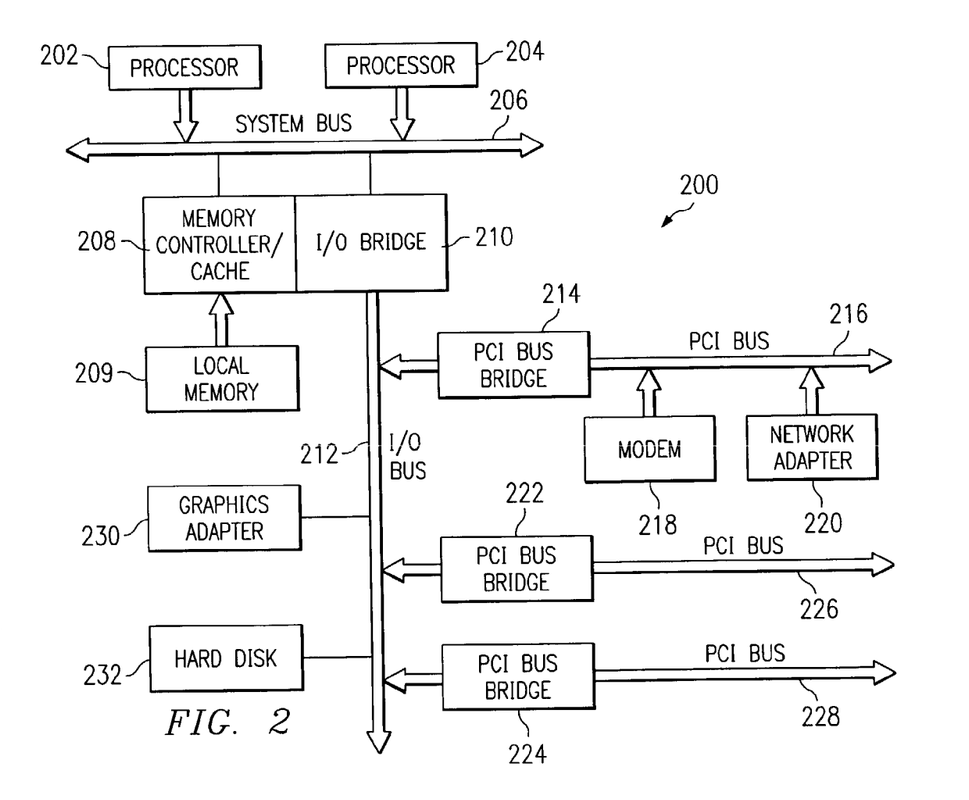
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
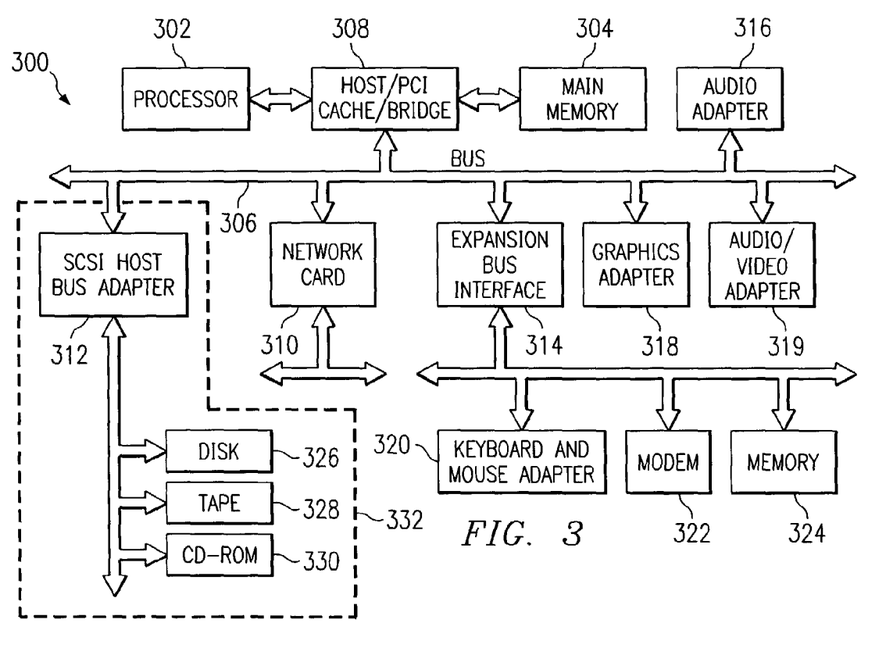
FIG. 3 depicts a block diagram of a computer system which may be utilized as a client computer system in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, network card 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

Network card 310 includes a media access (MAC) controller (not shown) which is assigned a unique MAC address. Before network card 310 transmits a packet, it inserts its MAC address into the header of the packet.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
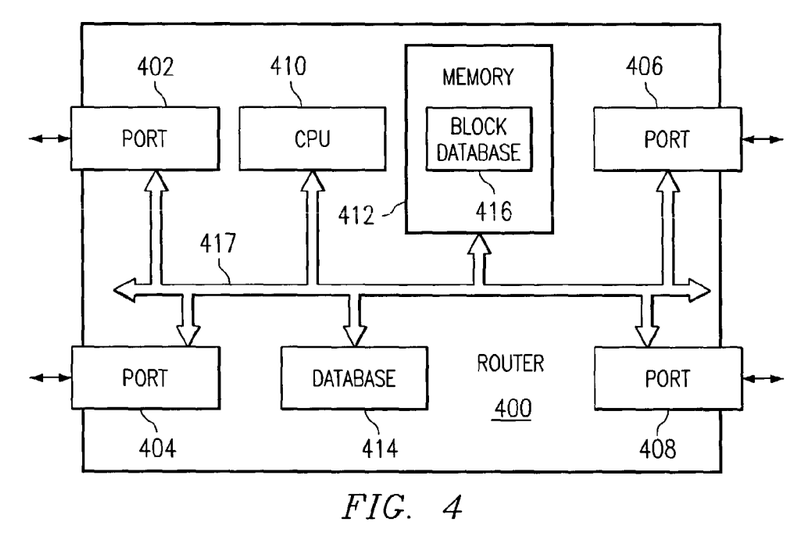
FIG. 4 illustrates a block diagram of a network communications device that is capable of blocking specified ones of its ports in accordance with the present invention.

FIG. 4 illustrates a block diagram of a multi-port network communications device 400 that is capable of blocking specified ones of its ports in accordance with the present invention. Network communications device 400 may be a router, a switch, a hub, or any other type of network communications device that includes multiple ports for receiving and forwarding network packets.

Device 400, such as a router, includes a plurality of ports 402, 404, 406, and 408. Although four ports are depicted, those skilled in the art will recognize that any number of ports may be included. In addition, router 400 includes a CPU 410, a memory 412, and a database 414. Database 414 is a hard file database implemented in hardware. In addition, another database, block database 416, is included which is implemented in software within memory 412. Information is stored in database 414 that identifies ports and computer systems that may have restricted access. The MAC address of a computer system will also be stored when that computer system is denied access through a port. Memory 412 may store packets, programs, or other data. Ports 402, 404, 406, and 408, CPU 410, memory 412, and database 414 are coupled together by a bus 417 which permits communication among these devices.

Network packets include a header portion and a data portion. The network protocol information including any media access control addresses are included in the header portion. Each network card that adheres to the Ethernet standard included in a computer system is identified using a unique media access control (MAC) address. This address is inserted by the network card into network packets before they are transmitted by the network card.

When a packet is received by router 400 through one of its ports, CPU 410 will first identify the port number through which the packet was received. CPU 410 will then access database 414 to determine whether that port number is stored in database 414. If that port number is stored in database 414, CPU 410 will determine from database 414 a restriction time period stored and associated with the particular port number. If CPU 410 determines that the current time is within this time period, CPU 410 will discard the packet. Thus, the computer system that is coupled to the particular port will not have access to the network to which router 400 is coupled. That port is effectively disabled during the specified time period.

When a computer system is denied access through a particular port, router 400 will store in database 414 an entry that includes the port number of that particular port, and the MAC address of the computer system that was denied access. If the same computer system later attempts to transmit a packet through a different port during the time period specified for the original port, access will be denied. Thus, this second port will be temporarily blocked but only for the particular computer system having the stored MAC address.

Figure 8:
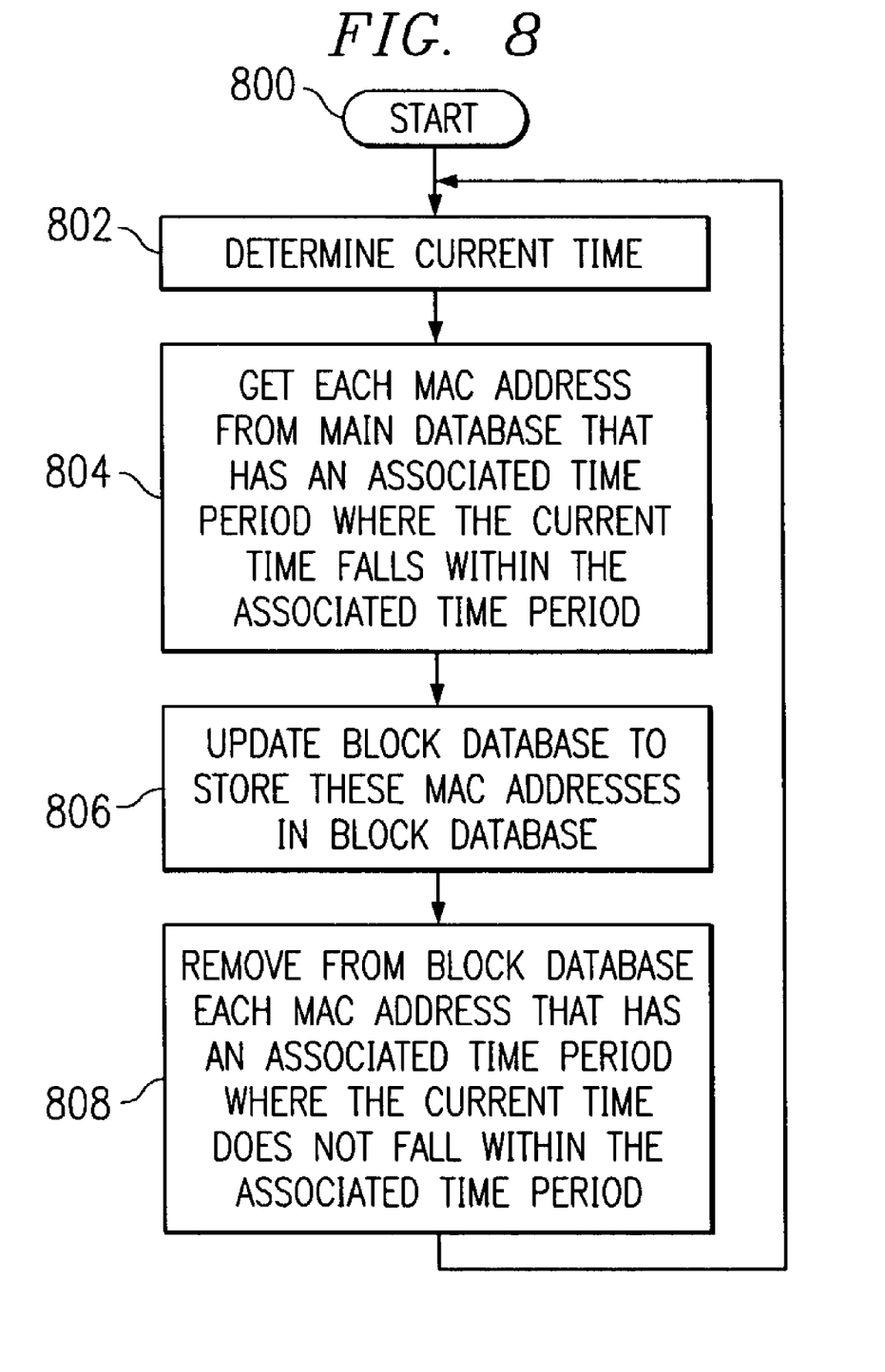
FIG. 8 illustrates a high level flow chart which depicts a routine that executes within a network communications device for dynamically updating a block database to include an indication of computer systems that are restricted from accessing a network in accordance with the present invention.

The present invention includes an update routine that resides in memory 412. The process of the update routine is depicted by FIG. 8. This routine repeatedly reads the main database 414 to determine whether database 414 includes any MAC addresses where the current time falls within a time period associated with the MAC address. If a MAC address is included in database 414 where the current time falls within the time period associated with that MAC address, the routine will store that MAC address in a second, block database. The routine will also repeatedly check the block database to remove any MAC addresses where the current time no longer falls within the time period associated with the MAC address.

In this manner, the block database is continually updated by adding and deleting MAC addresses. When a packet is received, the router need only check the block database to determine whether the MAC address of the computer that transmitted the packet is included in the block database. If that computer's MAC address is included in the block database, the packet is discarded. If that computer's MAC address is not included in the block database, the packet is forwarded.

Figure 5:
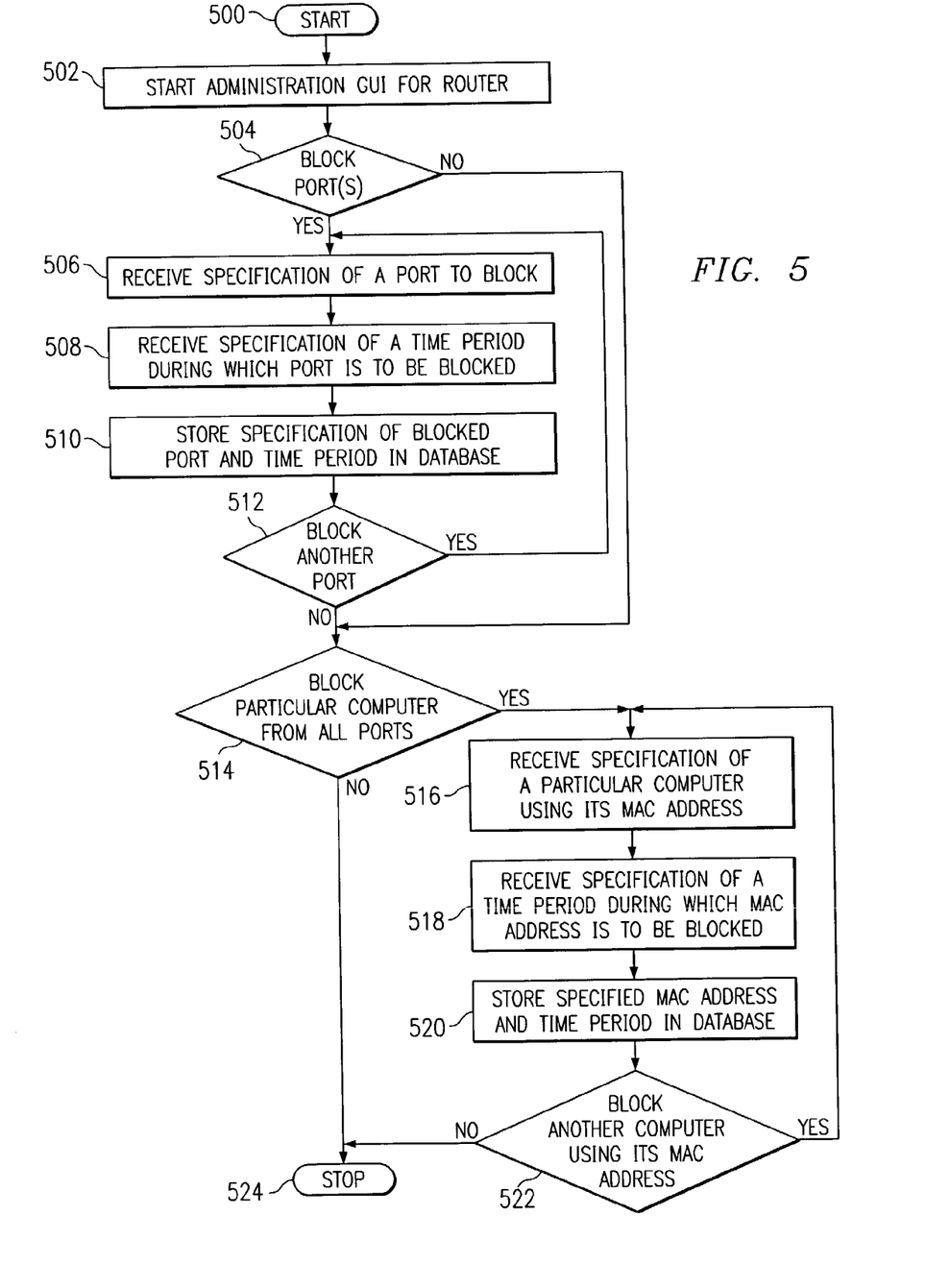
FIG. 5 depicts a high level flow chart which illustrates specifying one or more ports to be blocked and/or particular computer systems to be restricted from accessing a network communications device in accordance with the present invention.

FIG. 5 depicts a high level flow chart which illustrates specifying one or more ports to be blocked and/or particular computer systems to be restricted from accessing a network communications device in accordance with the present invention. The process starts as depicted by block 500 and thereafter passes to block 502 which illustrates an administration graphical user interface (GUI) being started for the particular communications device, such as a router. This administration GUI will preferably require a password before it may be accessed. Thus, only authorized users may change the communication access permitted by the network communications device. Through the administration GUI a user may identify one or more ports to block and a time period during which the port(s) is to be blocked. In addition, a user may specify a time period and particular computer that is to be restricted from accessing the network through any port during the time period. Any time period may be specified. The time period may be indefinite.

Next, block 504 depicts a determination of whether or not access to one or more of the router's ports is to be blocked. If access to one or more ports is to be blocked, the process passes to block 506 which illustrates a receipt of a specification of the port to be blocked.

The process then passes to block 508 which depicts a receipt of a specification of a time period during which access to the port is to be blocked. Next, block 510 illustrates the storage of the specification of the blocked port with its associated time period within database 414 of the communications device.

Block 512, then, depicts a determination of whether or not access to another port is to be blocked. If a determination is made that access to another port is to be blocked, the process passes back to block 506. Referring again to block 512, if a determination is made that access to no other port is to be blocked, the process passes to block 514.

Block 514 illustrates a determination of whether or not a particular computer system is to be restricted from accessing the network through all ports. If a determination is made that no particular computer system is to be restricted from accessing the network through all ports, the process terminates as depicted by block 524. Referring again to block 514, if a determination is made that access to the network is to be restricted through all ports for a particular computer system, the process passes to block 516 which depicts receiving a specification of a particular computer system by receiving that computer system's media access controller (MAC) address. Then, block 518 illustrates a receipt of a particular period of time during which access to the network is to be blocked for the specified MAC address. Next, block 520 depicts the storage in database 414 of the specified MAC address and time period. This computer system having the specified MAC address is thus blocked from using any port of the communications device. Thereafter, block 522 illustrates a determination of whether or not another computer system is to be restricted from accessing the network by blocking that computer system's MAC address. If a determination is made that access to the network is to be restricted for another computer system, the process passes to block 516. Referring again to block 522, if a determination is made that access to the network is not to be restricted for any other computer system, the process terminates as illustrated by block 524.

Figures 6, 7:
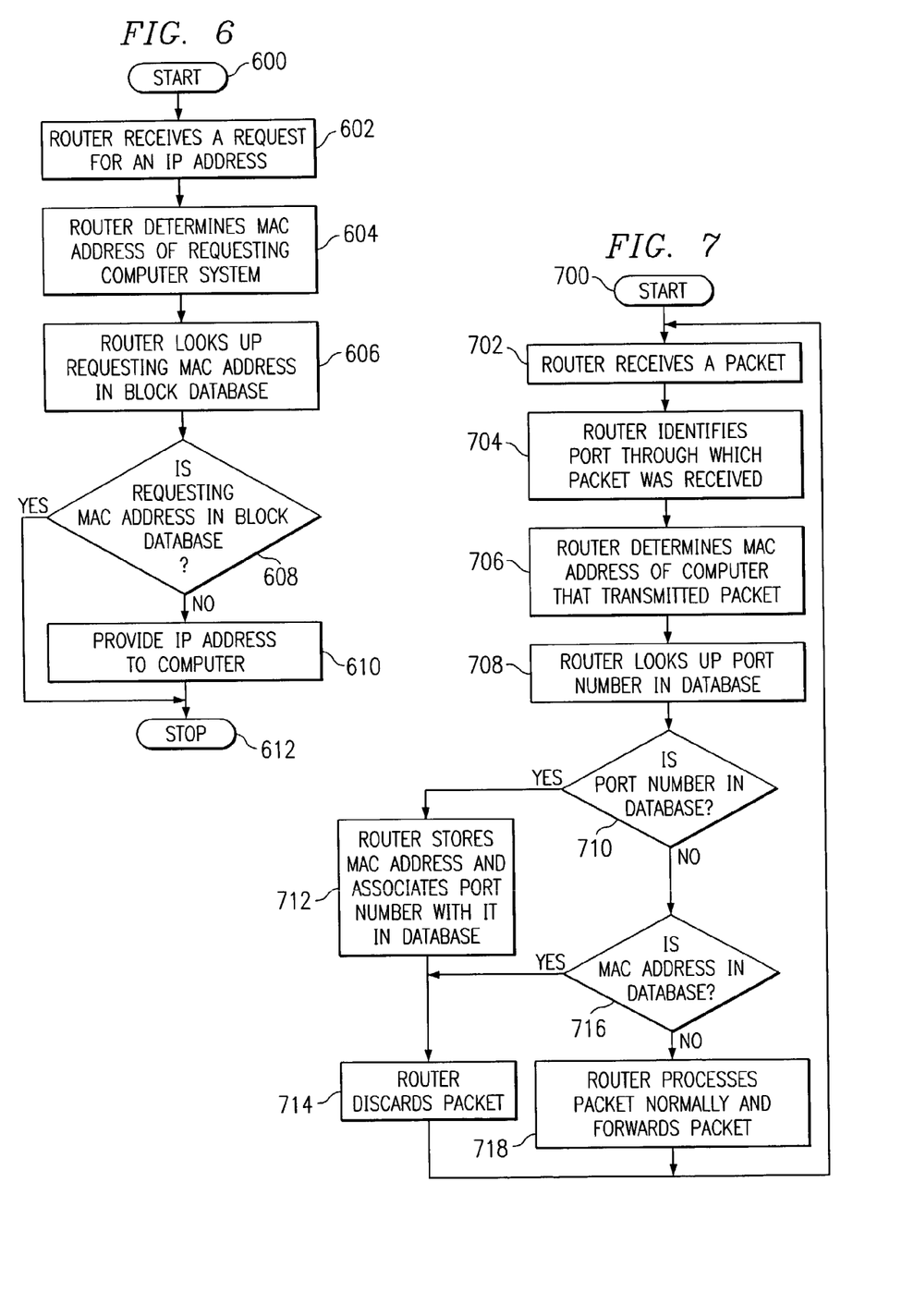
FIG. 6 illustrates a high level flow chart which depicts a network communications device denying an IP address to a particular computer system that has been specified as being restricted from accessing the network in accordance with the present invention.
FIG. 7 depicts a high level flow chart which illustrates a network communications device discarding packets from ports that have been blocked and from computer systems having restricted access to the network in accordance with the present invention.

FIG. 6 illustrates a high level flow chart which depicts a network communications device denying an IP address to a particular computer system that has been specified as being restricted from accessing the network in accordance with the present invention. The process starts as depicted by block 600 and thereafter passes to block 602 which illustrates a network communications device, such as a router, receiving a request for an IP address. When a protocol such as DCHP is used, a computer system requests an IP address from a DCHP server when the computer system needs to access the network using the DCHP server. Network communications devices such as routers may act as DCHP servers and may hand out IP addresses as needed.

The process then passes to block 604 which depicts the router determining the MAC address of the computer system that requested the IP address. Thereafter, block 606 illustrates the router looking up the computer system's MAC address in the block database 416. Next, block 608 depicts a determination of whether or not the MAC address of the requesting computer system was found in block database 416. If a determination is made that the MAC address was not found in block database 416, the process passes to block 610 which illustrates the router providing an IP address. The process then terminates as depicted by block 612. Referring again to block 608, if a determination is made that the MAC address of the requesting computer system was found in block database 416, the process terminates as illustrated by block 612.

FIG. 7 depicts a high level flow chart which illustrates a network communications device discarding packets from ports that have been blocked and from computer systems having restricted access to the network in accordance with the present invention. The process starts as illustrated by block 700 and thereafter passes to block 702 which depicts a network communications device, such as a router, receiving a packet for processing. Next, block 704 illustrates the router identifying the port number through which the packet was received. Block 706, then, depicts the router determining the MAC address of the computer that transmitted the packet. The process then passes to block 708 which illustrates the router looking up the port number in database 414.

Block 710, then, depicts a determination of whether or not the port number was found in database 414. If a determination was made that the port number was found in database 414, the process passes to block 712 which illustrates the router storing the MAC address and associating the port number with it in database 414. Next, block 714 depicts the router discarding the packet. Thus, network access is denied. The process then passes back to block 702.

Referring again to block 710, if a determination is made that the port number was not found in database 414, the process passes to block 716 which illustrates a determination of whether or not the MAC address of the computer that transmitted the packet is in block database 416. If a determination is made that the MAC address is not in block database 416, the process passes to block 718. Referring again to block 716, if a determination is made that the MAC address is in block database 416, the process passes to block 714.

FIG. 8 illustrates a high level flow chart which depicts a routine that executes within a network communications device for dynamically updating a block database to include an indication of computer systems that are restricted from accessing a network in accordance with the present invention. The process starts as depicted by block 800 and thereafter passes to block 802 which illustrates the routine determining the current time. Next, block 804 depicts the routine getting each MAC address from the main database 414 that has an associated time period where the current time falls within the associated time period.

The process then passes to block 806 which illustrates the routine updating block database 416 to store each of these MAC addresses in database 416. Thereafter, block 808 depicts the routine removing from block database 416 each MAC address that has an associated time period where the current time does not fall within the associated time period. The process then passes back to block 802.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, said method comprising the steps of:

providing a network communications device that includes multiple ports for providing access to a network;
receiving a specification of one of said multiple ports;
receiving a specification of a time period; and
blocking access to said network through said one of said multiple ports during said time period, wherein blocking access to said network further comprises:
receiving, within said network communications device, a first network packet;
responsive to a determination that said one of said multiple ports through which said first network packet was received is said specified one of said multiple ports and that a current time is within said time period, discarding said network packet;
storing a media access control address of a computer system that transmitted said first network packet and storing an identification of said one of said multiple ports through which said first network packet was received within said network communications device;
receiving a second packet;
identifying a second one of said multiple ports through which said second packet was received;
determining whether said second one of said multiple ports is said specified one of said multiple ports;
determining a time period associated with said second one of said multiple ports;
determining whether a current time is within said determined time period;
determining a media access control address of a computer system that transmitted said second packet;
responsive to a determination that either said second one of said multiple ports is not said specified one of said multiple ports or that said current time is not within said determined time period, determining whether said media access control address of said computer system that transmitted said second packet is stored in said network communications device; and
responsive to a determination that said media access control address of said computer system that transmitted said second packet is stored in said network communications device, discarding said second packet.

2. The method according to claim 1, further comprising the steps of:

storing said specified one of said multiple ports in a database in said network communication device;
storing said specified time period in said database in said network communication device; and
associating said specified one of said multiple ports with said specified time period together in said database.

3. The method according to claim 1, further comprising the steps of:

responsive to a determination that said media access control address of said computer system that transmitted said second packet is not stored in said network communications device, forwarding said second packet.

4. The method according to claim 1, further comprising the step of:

identifying one of said multiple ports through which said first network packet was received;
determining whether said one of said multiple ports through which said first network packet was received is said specified one of said multiple ports;
determining whether a current time is within said time period; and
in response to a determination that either said one of said multiple ports through which said first network packet was received is not said specified one of said multiple ports or that said current time is not within said time period, forwarding said first network packet to said network.

5. The method according to claim 1, further comprising:
responsive to a determination that said media access control address of said computer system that transmitted said second packet is not stored in said network communications device, forwarding said second packet.

6. The method according to claim 1, wherein said network communications device is a router.

7. The method according to claim 1, wherein said network communications device is a switch.

8. The method according to claim 1, wherein said network communications device is a hub.

9. The method according to claim 1, further comprising the steps of:
specifying a media access control address of a computer system which is to be restricted from accessing said network;
storing said media access control address in a database that is included in a memory in a said network communications device.

10. The method according to claim 9, further comprising the steps of:
storing said specification of one of said multiple ports in a second database within said communications device; and
storing said specification of said time period in said second database.

11. A data processing system comprising:
a network communications device that includes multiple ports for providing access to a network;
said network communications device including a CPU executing code for receiving a specification of one of said multiple ports;
said CPU executing code for receiving a specification of a time period; and
said network communications device for blocking access to said network through said one of said multiple ports during said time period, wherein blocking access to said network further comprises:
said network communications device for receiving a first network packet;
said network communications device discarding said network packet in response to a determination that said one of said multiple ports through which said first network packet was received is said specified one of said multiple ports and that a current time is within said time period
said network communications device for storing a media access control address of a computer system that transmitted said first network packet and an identification of said one of said multiple ports through which said first network packet was received within said network communications device;
said network communications device for receiving a second packet;
said CPU executing code for identifying a second one of said multiple ports through which said second packet was received;
said CPU executing code for determining whether said second one of said multiple ports is said specified one of said multiple ports;
said CPU executing code for determining a time period associated with said second one of said multiple ports;

said CPU executing code for determining whether a current time is within said determined time period;
said CPU executing code for determining a media access control address of a computer system that transmitted said second packet;
said CPU executing code for determining whether said media access control address of said computer system that transmitted said second packet is stored in said network communications device in response to a determination that either said second one of said multiple ports is not said specified one of said multiple ports or that said current time is not within said determined time period; and
said CPU executing code for discarding said second packet in response to a determination that said media access control address of said computer system that transmitted said second packet is stored in said network communications device.

12. The system according to claim 11, further comprising:
a database in said network communication device for storing said specified one of said multiple ports;
said database for storing said specified time period; and
said CPU executing code for associating said specified one of said multiple ports with said specified time period together in said database.

13. The system according to claim 11, further comprising:
said CPU executing code for forwarding said second packet in response to a determination that said media access control address of said computer system that transmitted said second packet is not stored in said network communications device.

14. The system according to claim 11, further comprising:
said CPU executing code for identifying one of said multiple ports through which said first network packet was received;
said CPU executing code for determining whether said one of said multiple ports through which said first network packet was received is said specified one of said multiple ports;
said CPU executing code for determining whether a current time is within said time period; and
in response to a determination that either said one of said multiple ports through which said first network packet was received is not said specified one of said multiple ports or that said current time is not within said time period, said network communications device forwarding said first network packet to said network.

15. The system according to claim 11, further comprising:
in response to a determination that said media access control address of said computer system that transmitted said second packet is not stored in said network communications device, said network communications device forwarding said second packet.

16. The system according to claim 11, further comprising said network communications device being a router.

17. The system according to claim 11, further comprising said network communications device being a switch.

18. The system according to claim 11, further comprising said network communications device being a hub.

19. The system according to claim 11, further comprising:
said CPU executing code for receiving a specified media access control address of a computer system which is to be restricted from accessing said network;
a database included in a memory in a said network communications device for storing said media access control address.

20. The system according to claim 19, further comprising:
a second database included within said communications device for storing said specification of one of said multiple ports; and
said specification of said time period being stored in said second database.

21. A computer readable medium encoded with a computer program, which, when executed in a data processing system, causes said data processing system to perform the following steps:
providing a network communications device that includes multiple ports for providing access to a network;
receiving a specification of one of said multiple ports;
receiving a specification of a time period; and
blocking access to said network through said one of said multiple ports during said time period, wherein blocking access to said network further comprises:
receiving a first network packet;
discarding said network packet in response to a determination that said one of said multiple ports through which said first network packet was received is said specified one of said multiple ports and that a current time is within said time period;
storing a media access control address of a computer system that transmitted said first network packet and an identification of said one of said multiple ports through which said first network packet was received within said network communications device;
receiving a second packet;
identifying a second one of said multiple ports through which said second packet was received;
determining whether said second one of said multiple ports is said specified one of said multiple ports;
determining a time period associated with said second one of said multiple ports;
determining whether a current time is within said determined time;
determining a media access control address of a computer system that transmitted said second packet;
determining whether said media access control address of said computer system that transmitted said second packet is stored in said network communications device in response to a determination that either said second one of said multiple ports is not said specified one of said multiple ports or that said current time is not within said determined time period; and
discarding said second packet in response to a determination that said media access control address of said computer system that transmitted said second packet is stored in said network communications device.

22. The product according to claim 21, further comprising:
instruction means for storing said specified one of said multiple ports in a database in said network communication device;
instruction means for storing said specified time period in said database in said network communication device; and
instruction means for associating said specified one of said multiple ports with said specified time period together in said database.

23. The product according to claim 21, further comprising:
instruction means for forwarding said second packet in response to a determination that said media access control address of said computer system that transmitted said second packet is not stored in said network communications device.

24. The product according to claim 21, further comprising:
instruction means for identifying one of said multiple ports through which said first network packet was received;
instruction means for determining whether said one of said multiple ports through which said first network packet was received is said specified one of said multiple ports;
instruction means for determining whether a current time is within said time period; and
in response to a determination that either said one of said multiple ports through which said first network packet was received is not said specified one of said multiple ports or that said current time is not within said time period, instruction means for forwarding said first network packet to said network.

25. The product according to claim 21, further comprising instruction means responsive to a determination that said media access control address of said computer system that transmitted said second packet is not stored in said network communications device, for forwarding said second packet.

26. The product according to claim 21, wherein said network communications device is a router.

27. The product according to claim 21, wherein said network communications device is a switch.

28. The product according to claim 21, wherein said network communications device is a hub.

29. The product according to claim 21, further comprising:
instruction means for specifying a media access control address of a computer system which is to be restricted from accessing said network;
instruction means for storing said media access control address in a database that is included in a memory in a said network communications device.

30. The product according to claim 29, further comprising:
instruction means for storing said specification of one of said multiple ports in a second database within said communications device; and
instruction means for storing said specification of said time period in said second database.

* * * * *